US012799429B2

(12) United States Patent
Farmer et al.

(10) Patent No.: US 12,799,429 B2
(45) Date of Patent: Nov. 17, 2026

(54) OXIDIZED IRON SURFACE SCALE REMOVER

(71) Applicant: W. M. BARR & COMPANY, INC., Memphis, TN (US)

(72) Inventors: Rachel A. Farmer, Memphis, TN (US); Jonathan Breon, Memphis, TX (US)

(73) Assignee: W.M. Barr & Company, Inc., Memphis, TN (US)

(*) Notice: Subject to any disclaimer, the term of this patent is extended or adjusted under 35 U.S.C. 154(b) by 0 days.

(21) Appl. No.: 19/465,449

(22) Filed: Jan. 30, 2026

(65) Prior Publication Data

US 2026/0218086 A1 Jul. 30, 2026

Related U.S. Application Data

(63) Continuation of application No. PCT/US2026/012306, filed on Jan. 23, 2026.

(Continued)

(30) Foreign Application Priority Data

Feb. 3, 2025 (NL) ..................................... 2039728

(51) Int. Cl.

*C11D 1/72* (2006.01)
*C11D 3/00* (2006.01)

(Continued)

(52) U.S. Cl.

CPC ................ *C11D 3/042* (2013.01); *C11D 1/72* (2013.01); *C11D 3/0073* (2013.01); *C11D 3/30* (2013.01);

(Continued)

(58) Field of Classification Search

CPC ............. C11D 1/72; C11D 3/042; C11D 3/30; C11D 7/3218; C11D 17/0026

(Continued)

(56) References Cited

U.S. PATENT DOCUMENTS

| | | | |
|---|---|---|---|
| 2,084,361 | A | 6/1937 | Vanderbilt |
| 4,381,249 | A | 4/1983 | Bouffard |

(Continued)

FOREIGN PATENT DOCUMENTS

| | | | |
|---|---|---|---|
| CA | 3136356 | A1 | 10/2020 |
| CN | 112239870 | A | 1/2021 |

(Continued)

OTHER PUBLICATIONS

International Search Report (ISR) and Written Opinion (WO) from International App. No. PCT/US2026/012306; mailed on Jun. 18, 2026; 28 pages.

(Continued)

*Primary Examiner* — Gregory R Delcotto
(74) *Attorney, Agent, or Firm* — Jason A. Smith; Shumaker, Loop & Kendrick, LLP

(57) ABSTRACT

A liquid rust removal composition including a mixture of an organic acid and an inorganic acid present in an effective amount to remove and/or prevent rust on a substrate post-application; a surfactant present in an effective amount to form a coating and/or adhere to the substrate post-application; a corrosion inhibitor dispersed within the liquid composition; and water at a concentration of up to 80 wt % of the liquid composition. Also, a gelatinous rust removal composition including a chlorinated acid present in an effective amount to remove and/or prevent rust on a substrate post-application; a surfactant present in an effective amount to form a coating and/or adhere to the substrate post-application; a corrosion inhibitor dispersed within the (Continued)

gelatinous composition; and water at a concentration of up to 40 wt % of the gelatinous composition.

17 Claims, 5 Drawing Sheets

Related U.S. Application Data

(60) Provisional application No. 63/749,186, filed on Jan. 24, 2025.

(51) Int. Cl.

| | |
|---|---|
| ***C11D 3/02*** | (2006.01) |
| ***C11D 3/04*** | (2006.01) |
| ***C11D 3/30*** | (2006.01) |
| ***C11D 7/32*** | (2006.01) |
| ***C11D 17/00*** | (2006.01) |
| ***C23G 1/06*** | (2006.01) |
| ***C23G 1/08*** | (2006.01) |

(52) U.S. Cl.
CPC ........ *C11D 7/3218* (2013.01); *C11D 17/0026* (2013.01); *C11D 17/003* (2013.01); *C23G 1/061* (2013.01); *C23G 1/088* (2013.01)

(58) Field of Classification Search
USPC .......................... 510/202, 209, 421, 499, 505
See application file for complete search history.

(56) References Cited

U.S. PATENT DOCUMENTS

| | | | | | |
|---|---|---|---|---|---|
| 4,496,404 | A | | 1/1985 | King | |
| 4,743,395 | A | * | 5/1988 | Leifheit | C11D 1/835 510/108 |
| 5,215,676 | A | * | 6/1993 | Stone | C23G 1/02 510/504 |
| 5,653,917 | A | | 8/1997 | Singerman | |
| 6,297,208 | B1 | * | 10/2001 | Crist | C11D 3/042 134/41 |
| 6,395,698 | B1 | | 5/2002 | Daun et al. | |
| 8,895,491 | B2 | * | 11/2014 | Vinson | C11D 3/2086 510/214 |
| 9,637,677 | B2 | * | 5/2017 | Talley | C11D 1/66 |
| 11,421,191 | B1 | * | 8/2022 | Soontravanich | C11D 3/042 |
| 2006/0180795 | A1 | * | 8/2006 | McCormick | C11D 3/2075 252/387 |
| 2018/0291315 | A1 | * | 10/2018 | Hershey | C11D 3/0042 |
| 2021/0032573 | A1 | * | 2/2021 | Marquard | B08B 3/08 |
| 2025/0084342 | A1 | * | 3/2025 | LaBelle | C11D 1/02 |

FOREIGN PATENT DOCUMENTS

| | | | | | |
|---|---|---|---|---|---|
| EP | 0875551 | A1 | * | 11/1998 | C11D 3/042 |
| EP | 0875552 | A1 | * | 11/1998 | C11D 3/042 |
| EP | 0875554 | A1 | * | 11/1998 | C11D 3/3707 |
| EP | 0919610 | A1 | | 6/1999 | |
| EP | 2060622 | A1 | * | 5/2009 | C11D 3/10 |
| EP | 3263688 | A1 | | 1/2018 | |
| EP | 3851558 | A1 | | 7/2021 | |
| GB | 2416773 | A | * | 2/2006 | C11D 3/2075 |
| WO | WO-9715649 | A1 | * | 5/1997 | C11D 3/042 |
| WO | WO-2019097321 | A1 | * | 5/2019 | C11D 3/3472 |

OTHER PUBLICATIONS

Non-Final Office Action for U.S. Appl. No. 19/464,897; dated May 4, 2026; 14 pages.

* cited by examiner

Ex. 2 Comp. 2 Comp. 3 Comp. 4

Comp. 3 Ex. 2 Comp. 5 Comp. 6

Comp. 7 Comp. 8 Comp. 9 Comp. 10 Comp. 11

20%

Sulfuric

Acid

OXIDIZED IRON SURFACE SCALE REMOVER

TECHNICAL FIELD

The present invention relates generally to the field of oxidized iron (e.g., rust) and oxidized iron surface scale removers, and more particularly, to liquid and gelatinous compositions that remove oxidized iron scales and/or oxidized iron surface scales from metal substrates and further prevents and delays re-rust time periods when compared with conventional rust removal formulations. In addition, the present invention relates to a use of a composition to prevent rust.

BACKGROUND

Metal substrates and surfaces, if composed of iron/ferrous materials, oxidize in the presence of oxygen and humid environments thereby forming rust. For example, if the $Fe^{2+}$ is exposed to oxygen, it may form $Fe^{3+}$ via oxidation and combined with water from the humid air, it may form $Fe^{3+}$ hydrate according to the following equation:

$$2Fe^{2+}(aq) + O_2(g) + 2xH_2O(l) \longrightarrow Fe_2O_3 \bullet H_2O(s) + 2H^+(aq)$$

where $Fe_2O_3 \cdot xH_2O(s)$ is rust, a hydrate of iron (III). The variable amount of hydration is represented by x. The iron oxides or rust scales/stains formed according to the above formula can have various colors, depending upon the extent of hydration. Iron oxide scales/stains can be colored yellow, orange, brown or even black, for example, which imparts a displeasing appearance to the metal substrate/surface on which it forms.

Commercially available cleaners/rust removers for rust stain removal typically include hydrofluoric acid as the active ingredient, and while effective as a rust/rust stain remover, hydrofluoric acid undesirably produces an "etching effect", which is frequently visually observed on enamel or glazed surfaces consisting of SiO or the like, such as tile and glass post treatment with these commercially available cleaners. For example, the above mentioned "etching effect" results when glass surfaces appear foggy, tile loses its shine or gloss, after exposure to hydrofluoric acid/treatment with commercially available cleaners/rust removers.

Further, while commercially available rust stain removal formulas are safe when their directions are followed and protective measures are taken (e.g., wearing protective eyewear, goggles, appropriate clothing, and shoewear), hydrofluoric acid causes severe burns when contacted with human skin, even in extremely small amounts. Thus, many problems with commercially available cleaners/rust removers exist, and to further exemplify these problems, currently proposed legislation in California proposes regulating and/or removing hydrofluoric acid from all cleaning products due to the above-mentioned health and safety concerns.

Exemplary rust removers are disclosed in, for example, U.S. Pat. No. 6,297,208 that discloses a composition of ammonia bifluoride, boric acid, and oxalic acid to remove rust; U.S. Pat. No. 5,653,917 by Gary Singerman, that discloses a composition of alkali metal dihydrogen citrates and citric acid to remove rust; U.S. Pat. No. 5,215,676 by John Stone, that discloses a composition of hydrochloric acid and phosphoric acids with ammonium chlorides and organic sulfates to remove rust; U.S. Pat. No. 4,496,404 by Parker Chemical Company, discloses a rust removing composition containing an acidic composition of aluminum, fluoride, and/or titanium, zirconium, hafnium; U.S. Pat. No. 4,381,249 by Joseph Bouffard disclosed a rust removing and metal surface protecting composition comprising phosphoric acid, 1,3-dibutylthiourea and a non-ionic surfactant; U.S. Pat. No. 2,084,361 by Byron Vanderbilt disclosed a metal cleaning composition comprising a water soluble acid ester of a dehydrated phosphoric acid and an organic compound containing a primary alcohol group. As alluded to above, many safety and health problems coupled with "etching effects" exist when using these conventional rust removers.

Additionally, U.S. Pat. No. 6,395,698 discloses a rust remover composition that includes a mixture of quaternary ammonium chloride compounds. Their composition includes sequestering agents that tie up/bind the halide ion generated to prevent formation of unwanted acid. Thus, compositions in U.S. Pat. No. 6,395,698 do not contain inorganic acids (e.g., hydrochloric acid) such as those disclosed in the pending application and thus, would not remove rust from a substrate's surface by the same mode as the compositions disclosed herein and/or as effectively as the compositions disclosed herein.

Chinese Pat. 112239870 discloses a composition with a combination of inorganic acids including sulfuric acid, nitric acid, hydrofluoric acid, and phosphoric acid. The compositions in Chinese Pat. 112239870 do not include hydrochloric acid but instead specifically teach the combination of concentrated sulfuric acid and concentrated nitric acid solution can release more hydrogen ions without the volatility of hydrochloric acid. Thus, when read in its entirety, Chinese Pat. 112239870 discourages the use of hydrochloric acid (i.e., muriatic acid) alone and/or in combination with other inorganic acids.

European Pat. 3851558 discloses a composition with multiple organic acids in combination with hydrochloric acid. Lower concentrations of hydrochloric acid are used as additional acids are included in the composition. Furthermore, a combination of surfactants are utilized in their compositions, unlike the individual surfactant that is used in the compositions of the present Application. The surfactant disclosed in the present Application imparts thickening properties which produce the desired viscosity of the composition. The surfactants disclosed in European Pat. 3851558 would not impart the operable viscosities disclosed herein at ambient temperatures, thus decreasing the rust removal properties of the composition.

Moreover, neither U.S. Pat. No. 6,395,698 nor Chinese Pat. 112239870 and European Pat. 3851558 disclose a gelatinous composition for direct application/use on a substrate. Instead, the compositions in U.S. Pat. No. 6,395,698, Chinese Pat. 112239870, and European Pat. 3851558 are diluted before use producing a liquid composition that is subsequently applied to a substrate. In contrast, the gelatinous compositions in the present Application are specifically used for direct application to a large and/or vertical surface of a substrate in combination with specific dwell times (i.e., substrates that are incapable of being immersed in the compositions). Lowering the viscosity of the composition would negatively affect the application and/or spreadability and/or dwell times, as well as the rust removing efficacy, of the compositions post-application.

SUMMARY

In view of the above-mentioned problems, a need exists to provide rust removal compositions that avoid and/or mitigate the safety concerns and etching effects observed when using conventional rust removers. Moreover, the disclosed rust removers (liquid rust removal composition and/or gelatinous rust removal composition) further advantageously slow the rate of re-rust of ferrous containing/metal substrates after cleaning with the rust removers disclosed herein, which advantageously results in less frequent cleanings of these ferrous containing/metal substrates.

In certain aspects, disclosed is a liquid rust removal composition comprising: a mixture of an organic acid and an inorganic acid present in an effective amount to remove and/or prevent rust on a substrate post-application; a surfactant present in an effective amount to form a coating and/or adhere to the substrate post-application; a corrosion inhibitor dispersed within the liquid composition; and water at a concentration of up to 80 wt % of the liquid composition. The liquid rust removal composition has a pH ranging from 3.5 to 8.5, more preferably 4.0 to 8.0 as well as a viscosity ranging from 4.5 to 7.5 cPs, more preferably 5 to 7 cPs at 22.5° C. to 27.0° C.

In certain aspects, the organic acid is present in the liquid rust removal composition in a greater amount than the inorganic acid.

In certain aspects, the ratio of the organic acid to the inorganic acid in the liquid composition ranges from 35:1 to 20:1, more preferably 33:1 to 22:1.

In certain aspects, the organic acid is present at a concentration ranging from 50 wt % to 70 wt %, more preferably 55 wt % to 64 wt % of an overall concentration of the mixture of the organic acid and the inorganic acid, and the inorganic acid is present at a concentration ranging from from 1 wt % to 15 wt %, more preferably 1.5 wt % to 10 wt % of the overall concentration of the mixture of the organic acid and the inorganic acid.

In certain aspects, the organic acid is present at a concentration ranging from 4 wt % to 12 wt %, more preferably 5 wt % to 10 wt % of an overall concentration of the liquid composition, and the inorganic acid is present at a concentration ranging from 0.05 wt % to 5 wt %, more preferably 0.1 wt % to 4 wt % of the overall concentration of the liquid composition.

In certain aspects, the mixture of the organic acid and the inorganic acid comprises a blend of phosphorus oxoacids.

In certain aspects, the organic acid comprises a diphosphonic acid, more preferably 1-hydroxyethylidene-1,1-diphosphonic acid.

In certain aspects, the inorganic acid comprises phosphorous acid (also referred to as phosphonic acid).

In certain aspects, the surfactant is present at a concentration ranging from 0.5 wt % to 10 wt %, preferably 0.75 wt % to 6 wt % of the overall concentration of the liquid composition.

In certain aspects, the surfactant is a non-ionic surfactant.

In certain aspects, the surfactant comprises an alkyl polyglucoside, more preferably a C6-C20 alkyl polyglucoside, even more preferably a C6-C16 alkyl polyglucoside, and even more preferably a C8-C12 alkyl polyglucoside and preferably has a pH ranging from 10.0 to 13.0 (in isopropanol), more preferably 11.0 to 12.75 (in isopropanol) and a viscosity of 500 to 1,500 mPas at 40° C. and has a hydrophilic-lipophilic balance (HLB) value of less than 15 and more preferably has an HLB value ranging from 11.0 to 14, and more preferably 12.5 to 13.5. In certain aspects, the HLB value is 13.0

In certain aspects, the surfactant comprises a hydrophilic-lipophilic balance (HLB) value of greater than 10 and less than 15.

In certain aspects, the surfactant is used for water-in-oil emulsions or oil-in-water emulsions.

In certain aspects, the corrosion inhibitor is present in the liquid composition in an effective amount to impart corrosion inhibition, resistance, and/or re-rust inhibition and/or resistance post-application of the liquid composition to a substrate (i.e., a substrate having rust scales thereon). In certain aspects the corrosion inhibitor is a chelant and/or a chelating agent capable of, for example, binding iron and/or iron oxide(s) (e.g., rust and/or rust scales) and cleaning and/or removing iron and/or iron oxide(s) (e.g., rust and/or rust scales) from a substrate post-application of the liquid composition to the substrate.

In certain aspects, the corrosion inhibitor is present at a concentration ranging from 8 wt % to 18 wt %, preferably 10 wt % to 15 wt % of the overall concentration of the liquid composition.

In certain aspects, the corrosion inhibitor has a molecular weight ranging from 125 g/mol to 175 g/mol, preferably 140 g/mol to 160 g/mol.

In certain aspects, the corrosion inhibitor has a boiling point ranging from 300° C. to 375° C., preferably 325° C. to 350° C.

In certain aspects, the corrosion inhibitor is a tertiary amino compound.

In certain aspects, the corrosion inhibitor has an amine moiety and/or an alcohol moiety and/or is an amino alcohol compound.

In certain aspects, the corrosion inhibitor is triethanolamine.

In certain aspects, the ratio of the corrosion inhibitor to an overall amount of the mixture of the organic acid and the inorganic acid is present in 2:1 to 1:2, more preferably 1.5:1 to 1:1.5, most preferably 1:1.

In certain aspects, the corrosion inhibitor is homogeneously dispersed within the liquid composition.

Also disclosed herein are gelatinous rust removal compositions comprising: a chlorinated acid present in an effective amount to remove and/or prevent rust on a substrate post-application; a surfactant present in an effective amount to form a coating and/or adhere to the substrate post-application and that is compatible with the chlorinated acid; a corrosion inhibitor dispersed within the gelatinous composition; and water at a concentration of up to 40 wt % of the gelatinous composition.

In certain aspects, the chlorinated acid is present at a concentration ranging from 50 wt % to 80 wt %, more preferably 55 wt % to 75 wt %, even more preferably 60 wt % to 70 wt % of an overall concentration of the gelatinous composition and/or an active concentration of 15 wt % to 27 wt %, more preferably 17.5 wt % to 25 wt %, even more preferably 20 wt % to 25 wt % of the overall concentration of the gelatinous composition.

In certain aspects, the chlorinated acid is an inorganic acid.

In certain aspects, the chlorinated acid has a molecular weight ranging from 20 g/mol to 100 g/mol, preferably 30 g/mol to 50 g/mol.

In certain aspects, the chlorinated acid has a density ranging from 1.0 g/mL to 1.8 g/mL, more preferably 1.1 g/mL to 1.5 g/mL.

In certain aspects, the inorganic acid comprises muriatic acid.

In certain aspects, the surfactant is present at a concentration ranging from 0.5 wt % to 5 wt %, preferably 1 wt % to 4 wt % of the overall concentration of the gelatinous composition. In certain aspects, the surfactant has a dual-role within the gelatinous rust removal composition such that the surfactant acts as a thickening agent imparting the desired viscosities of the composition at ambient temperatures as well as aiding coating formation and/or adherence to the substrate post-application of the composition thereon.

In certain aspects, the surfactant is a non-ionic surfactant.

In certain aspects, the surfactant comprises a hydrophilic-lipophilic balance (HLB) value of less than 10; and/or a HLB ranging from 1.0 to 9.5, more preferably 1.5 to 7.5, even more preferably 2.5 to 6.5, even more preferably 3.0 to 5.5; and/or a viscosity of 65 to 75 cPs, more preferably 68 to 72 cPs at 38° C.

In certain aspects, the surfactant is used for water-in-oil emulsions or oil-in-water emulsions.

In certain aspects, the surfactant comprises a surfactant having an amine moiety, an alcohol moiety, or a combination thereof.

In certain aspects, the surfactant comprises an amine ethoxylate.

In certain aspects, the surfactant comprises tallow amine ethoxylates. As alluded to above, in certain aspects, the surfactant and more particularly the amine ethoxylate, more preferably the tallow amine ethoxylates has a dual-role within the gelatinous rust removal composition such that the surfactant acts as a thickening agent imparting the desired viscosities of the composition at ambient temperatures as well as aiding coating formation and/or adherence to the substrate post-application of the composition thereon.

In certain aspects, the corrosion inhibitor is present in the gelatinous composition in an effective amount to impart corrosion inhibition, resistance, and/or re-rust inhibition and/or resistance post-application of the gelatinous composition to a substrate (i.e., a substrate having rust scales thereon). In certain aspects the corrosion inhibitor is a chelant and/or a chelating agent capable of, for example, binding iron and/or iron oxide(s) (e.g., rust and/or rust scales) and cleaning and/or removing iron and/or iron oxide(s) (e.g., rust and/or rust scales) from a substrate post-application of the liquid composition to the substrate.

In certain aspects, the gelatinous composition has a pH ranging from 0.75 to 2.5, more preferably from 1.0 to 2.0.

In certain aspects, the gelatinous composition has a viscosity ranging from 10 cPs to 10,000 cPs, more preferably 500 cPs to 10,000 cPs at 22.5° C. to 27.0° C.

In certain aspects, the corrosion inhibitor is present at a concentration ranging from 1 wt % to 5 wt %, preferably 2 wt % to 4 wt % of the overall concentration of the gelatinous composition.

In certain aspects, the corrosion inhibitor has a molecular weight ranging from 125 g/mol to 175 g/mol, preferably 140 g/mol to 160 g/mol.

In certain aspects, the corrosion inhibitor has a boiling point ranging from 300° C. to 375° C., preferably 325° C. to 350° C.

In certain aspects, the corrosion inhibitor is a tertiary amino compound.

In certain aspects, the corrosion inhibitor has an amine moiety and/or an alcohol moiety and/or is an amino alcohol compound.

In certain aspects, the corrosion inhibitor is triethanolamine.

In certain aspects, the ratio of the corrosion inhibitor to the chlorinated acid is present in 1:20 to 1:40, more preferably 1:15 to 1:35.

In certain aspects, the corrosion inhibitor is homogeneously dispersed within the gelatinous composition.

Also disclosed are articles comprising a metal substrate contacted with the liquid rust removal composition and/or gelatinous rust removal composition disclosed herein. The metal substrate is a ferrous containing metal substrate. The metal substrate comprises oxidized iron (rust) and/or oxidized iron (rust) scale(s). More particularly, the oxidized iron is $Fe_2O_3$, $Fe_2O_3 \cdot xH_2O(s)$, or a combination thereof in which a variable amount of water/hydration is represented by x.

A rust removal method comprising (a) applying the liquid rust removal composition or the gelatinous rust removal composition disclosed herein to a metal substrate; and (b) removing oxidized iron (rust) from a surface of the metal substrate, preferably for a predetermined period of time in which the metal substrate is not etched (acid etched) and/or is minimally acid etched when compared with conventional rust removal compositions.

A use of a gelatinous composition is disclosed for removal and/or prevention of rust on a metal substrate after application of said composition as a coating on said substrate, said composition comprising: i) an inorganic chlorinated acid present at a concentration ranging from 50 wt. % to 80 wt. % of the overall concentration of the gelatinous composition; ii) a non-ionic surfactant comprising a hydrophilic-lipophilic balance (HLB) value of less than 10 that is present at a concentration ranging from 0.5 wt. % to 5 wt. % of the overall concentration of the gelatinous composition; iii) a corrosion inhibitor being a tertiary amino compound that is present at a concentration ranging from 1 wt. % to 5 wt. % of the overall concentration of the gelatinous composition, said corrosion inhibitor being dispersed within the gelatinous composition; and iv) water at a concentration of up to 40 wt. % of the gelatinous composition; wherein said gelatinous composition has a pH ranging from 0.75 to 2.5 and a viscosity ranging from 10 cPs to 10,000 cPs at 22.5° C. to 27.0° C.

BRIEF DESCRIPTION OF THE DRAWINGS

The drawings described herein are for illustrative purposes for selected embodiments and not all possible implementations and are not intended to limit the scope of the present disclosure.

DETAILED DESCRIPTION

Figure 1:
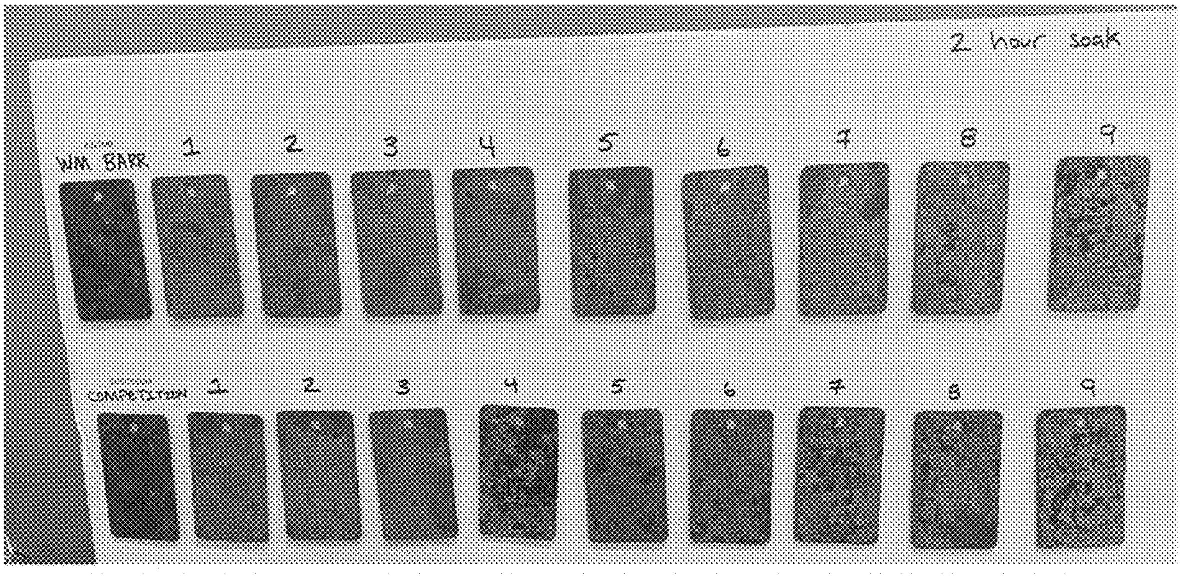
FIG. 1 is a photograph displaying rust removal efficacy of an Exemplary Composition and a Comparative Composition from a metal substrate after repeated uses of the Exemplary Composition and Comparative Composition respectively.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Further, the term "or" as used in this disclosure and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in," "at," and/or "on," unless the context clearly indicates otherwise. The phrase "in one embodiment," as used herein does not necessarily refer to the same embodiment, although it may.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within the ranges as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. as well as 1, 2, 3, 4, and 5, individually. The same principle applies to ranges reciting only one numerical value as a minimum or a maximum. Furthermore, such an interpretation should apply regardless of the breadth of the range or the characteristics being described.

The term gel and/or gelatinous and/or jelly is a semi-solid material with a viscosity ranging from 10 to 10,000 cPs at ambient temperature. In certain aspects, a gel has a viscosity of 100 cPs at ambient temperature. In certain aspects, a jelly has a viscosity of 3,000 cPs at ambient temperature.

Diphosphonic acid is a phosphorus oxoacid and acyclic phosphorus acid anhydride. It is a bifunctional compound with phosphonate groups. The phosphonate groups can coordinate metal ions by providing oxygen atoms. In certain aspects, diphosphonic acid refers to 1-hydoxyethylidene-1, 1-diphosphonic acid (HEDP) which is an organic compound due to the presence of carbon atoms.

Liquid Rust Removal Compositions

In certain aspects, it is desired to clean and/or remove oxidized iron (rust) and/or oxidized iron (rust) scale(s) on and/or from a substrate (also referred to as "metal substrate") to provide a more aesthetically pleasing appearance by applying a liquid composition thereon and/or submerging the substrate into the liquid composition for a predetermined period of time thereby removing rust from the substrate. This composition, when compared with conventional rust removers, is preferably easy to handle and avoids, if not eliminates, most if not all of the health and safety concerns observed with conventional rust/rust scale removers. Thus, disclosed is a liquid rust removal composition that achieves this objective.

The liquid rust removal composition disclosed herein includes a mixture of an organic acid and an inorganic acid present in an effective amount to remove and/or prevent rust on a substrate post-application; a surfactant present in an effective amount to form a coating and/or adhere to the substrate post-application; a corrosion inhibitor dispersed (preferably homogeneously dispersed) within the liquid composition; and water at a concentration of up to 80 wt % of the liquid composition. The liquid rust removal composition has a pH ranging from 3.5 to 8.5, more preferably 4.0 to 8.0, in which any endpoint within these ranges can serve as endpoints for any additional sub-range falling therein as well as a viscosity ranging from 4.5 to 7.5 cPs, more preferably 5 to 7 cPs, in which any endpoint within these ranges can serve as endpoints for any additional sub-range falling therein at 22.5° C. to 27.0° C. The disclosed viscosities are desired due to ease of spreadability/applicability/application onto the surface substrate at ambient temperatures.

To further ensure ease of handling while avoiding the health and safety concerns observed with conventional rust removers, the organic acid disclosed herein is present in the liquid rust removal composition in a greater amount than the inorganic acid. The ratio of the organic acid to the inorganic acid in the liquid composition ranges from 35:1 to 20:1, more preferably 33:1 to 22:1, in which any endpoint within these ranges can serve as endpoints for any additional sub-range falling therein, and the organic acid is present at a concentration ranging from 50 wt % to 70 wt %, more preferably 55 wt % to 64 wt % of an overall concentration of the mixture of the organic acid and the inorganic acid, in which any endpoint within these ranges can serve as endpoints for any additional sub-range falling therein, and the inorganic acid is present at a concentration ranging from 1 wt % to 15 wt %, more preferably 1.5 wt % to 10 wt % of the overall concentration of the mixture of the organic acid and the inorganic acid, in which any endpoint within these ranges can serve as endpoints for any additional sub-range falling therein. While, the organic acid is present at a concentration ranging from 4 wt % to 12 wt %, more preferably 5 wt % to 10 wt % of an overall concentration of the liquid composition, in which any endpoint within these ranges can serve as endpoints for any additional sub-range falling therein, and the inorganic acid is present at a concentration ranging from 0.05 wt % to 5 wt %, more preferably 0.1 wt % to 4 wt % of the overall concentration of the liquid composition, in which any endpoint within these ranges can serve as endpoints for any additional sub-range falling therein. In certain aspects, the mixture of the organic acid and the inorganic acid comprises a blend of phosphorus oxoacids. In certain aspects, the organic acid is an acid and/or a phosphorus oxoacid that includes carbon groups therein and/or carbon-based functional groups therein and/or with the proviso that the organic acid (and/or a phosphorus oxoacid) excludes acids having carboxylic acid groups (COOH) therein. In this regard, the organic acid includes methylene phosphonic acid(s) and/or diphosphonic acid(s), more preferably 1-hydroxyethylidene-1,1-diphosphonic acid while the inorganic acid includes phosphorous acid (also referred to as phosphonic acid).

In certain aspects, the surfactant aids in adherence of the liquid composition to the substrate as well as the subsequent rust/rust scale removal and/or reduction in the rate of re-rust. The surfactant is present at a concentration ranging from 0.5 wt % to 10 wt %, preferably 0.75 wt % to 6 wt % of the overall concentration of the liquid composition, in which any endpoint within these ranges can serve as endpoints for any additional sub-range falling therein and is preferably dispersed (e.g., homogeneously dispersed) throughout the liquid composition. In certain aspects, the surfactant is a non-ionic surfactant.

The surfactant is preferably environmentally friendly and/or includes a safer hazard profile than surfactants often included in other conventional rust removers. In this aspect, the surfactant includes an alkyl polyglucoside, more preferably a C6-C20 alkyl polyglucoside, even more preferably a C6-C16 alkyl polyglucoside, and even more preferably a C8-C12 alkyl polyglucoside and preferably has a pH ranging from 10.0 to 13.0 (in isopropanol), more preferably 11.0 to 12.75 (in isopropanol), in which any endpoint within these ranges can serve as endpoints for any additional sub-range falling therein and a viscosity of 500 to 1,500 mPas, in which any endpoint within these ranges can serve as endpoints for any additional sub-range falling therein at 40° C. and has a hydrophilic-lipophilic balance (HLB) value of less than 15 and more preferably has an HLB value ranging from 11.0 to 14, and more preferably 12.5 to 13.5, in which any endpoint within these ranges can serve as endpoints for any additional sub-range falling therein. In certain aspects, the HLB value is 13.0 In certain aspects, the surfactant comprises a hydrophilic-lipophilic balance (HLB) value of greater than 10 and less than 15. The HLB value(s) disclosed herein are preferred because of its water solubility properties and/or detergency occurring within this HLB range. In certain aspects, the surfactant's HLB value will not be below 10.0 because water solubility will be too low, and in certain aspects the surfactant's HLB value will not exceed 15.0 because detergency is disadvantageously affected.

Also as alluded to above, the corrosion inhibitor is present in the liquid composition in an effective amount to impart corrosion inhibition, resistance, and/or re-rust inhibition and/or resistance post-application of the liquid composition to a substrate (i.e., a substrate having rust scales thereon). In certain aspects the corrosion inhibitor is a chelant and/or a chelating agent capable of, for example, binding iron and/or iron oxide(s) (e.g., rust and/or rust scales) and cleaning and/or removing iron and/or iron oxide(s) (e.g., rust and/or rust scales) from a substrate post-application of the liquid composition to the substrate. The corrosion inhibitor is present at a concentration ranging from 8 wt % to 18 wt %, preferably 10 wt % to 15 wt % of the overall concentration of the liquid composition, in which any endpoint within these ranges can serve as endpoints for any additional sub-range falling therein. The corrosion inhibitor has a molecular weight ranging from 125 g/mol to 175 g/mol, preferably 140 g/mol to 160 g/mol, in which any endpoint within these ranges can serve as endpoints for any additional sub-range falling therein. The corrosion inhibitor has a boiling point ranging from 300° C. to 375° C., preferably 325° C. to 350° C., in which any endpoint within these ranges can serve as endpoints for any additional sub-range falling therein. In certain aspects, the corrosion inhibitor is a tertiary amino compound and/or the corrosion inhibitor has an amine moiety and/or an alcohol moiety and/or is an amino alcohol compound. The corrosion inhibitor includes at least and/or is preferably triethanolamine.

The ratio of the corrosion inhibitor to an overall amount of the mixture of the organic acid and the inorganic acid is present in 2:1 to 1:2, more preferably 1.5:1 to 1:1.5, in which any endpoint within these ranges can serve as endpoints for any additional sub-range falling therein, and is most preferably 1:1 in the liquid composition.

Also disclosed herein are rust removal methods including (a) applying the above-mentioned liquid rust removal composition(s) to and/or submerging a metal substrate, more preferably to a metal substrate having oxidized iron and/or iron oxides (rust) thereon, for example, for a predetermined period of time (for example 2 minutes to 5 hours, more preferably 20 minutes to 3 hours in which any endpoint within these ranges can serve as endpoints for any additional sub-range falling therein); and (b) removing oxidized iron and/or iron oxides (rust) from a surface of the metal substrate to achieve a desired clean surface appearance. Either during and/or after step (b), after soaking the rusty part in cleaning solution, the consumer can use a stiff bristle brush to remove loosened rust. After all rust is removed rinse item with water and dry thoroughly. The desired clean surface appearance may include a substrate having an L value ranging from 50 to 80, more preferably 60 to 80 after step (b) and/or a change in L value ranging from 18 to 40 (post-application and removal of the liquid composition), in which any endpoint within these ranges can serve as endpoints for any additional sub-range falling therein, when compared with the initial L value (pre-application of the liquid composition). In certain aspects, no acid etching occurs on the outer surface of the substrate post-application and/or post-removal of the oxidized iron and/or iron oxides (rust) from the surface of the metal substrate. In certain aspects, the metal substrate includes but is not limited to tools (wrenches, hammers, screw drivers, plyers, bolts, screws, nails, rotors, hooks for hanging items, shovels, scissors), automotive parts, and decorative items. In certain aspects and when submerging metal substrates within the liquid rust removal composition, the liquid rust removal composition may be re-used for multiple cleanings, which includes 1 to 15 cleanings/submersions of metal substrates during the predetermined time period, and more particularly 4 to 15 cleanings/submersions (in which any endpoint within these ranges can serve as endpoints for any additional sub-range falling therein) of metal substrates during the predetermined time period. As shown in FIG. 1, the disclosed liquid rust remover can be advantageously used much longer than conventional rust removers, and thus able to remove more rust than the leading competition. For example, FIG. 1 shows multiple panels that were soaked in the same solution. A panel was soaked for 2 hours, removed, and the next panel was added. As shown in FIG. 1, the competitor performance (rust removal) visually decreased after submerging a fourth panel in its solution, while rust removal remained constant (visual removal of rust) in the exemplary liquid rust removal composition even after submerging (sequentially submerging) nine panels therein.

Gelatinous Rust Removal Compositions

As alluded to above, it is desired to clean and/or remove oxidized iron (rust) and/or oxidized iron (rust) scale(s) on and/or from a substrate to provide a more aesthetically pleasing appearance. However, in certain instances, the substrate and/or metal substrate cannot feasibly be placed into and/or submerged within a liquid rust removal composition and/or the positioning of the metal substrate does not allow for optimal application and/or dwell time of a liquid composition on the substrate/metal substrate and/or removal of rust from the substrate and/or metal substrate.

Therefore, in certain aspects, it is desired to further provide for gelatinous rust removal compositions (also referred to as "gelatinous composition") that addresses the above-mentioned problems. Moreover, similar to the liquid rust removal compositions disclosed herein, the gelatinous rust removal compositions are also preferably easy to handle and avoids, if not eliminates, most if not all of the health and safety concerns observed with conventional rust/rust scale removers. Specifically disclosed herein are gelatinous rust removal compositions comprising: a chlorinated acid present (and preferably homogeneously dispersed/mixed within the gelatinous rust removal composition) in an effective amount to remove and/or prevent rust on a substrate post-application; a surfactant present in an effective amount to form a coating and/or adhere to the substrate post-application and that is compatible with the chlorinated acid; a corrosion inhibitor dispersed within the gelatinous composition (and more preferably homogeneously dispersed/mixed within the gelatinous rust removal composition); and water at a concentration of up to 40 wt % of the gelatinous composition (in which, for water, any endpoint within these ranges can serve as endpoints for any additional sub-range falling therein). In certain aspects, the gelatinous composition has a pH ranging from 0.75 to 2.5, more preferably from 1.0 to 2.0 in which any endpoint within these ranges can serve as endpoints for any additional sub-range falling therein. In certain aspects, the gelatinous composition has a viscosity ranging from 10 cPs to 10,000 cPs, more preferably 200 cPs to 10,000 cPs, more preferably 500 cPs to 10,000 cPs, even more preferably 1000 cPs to 10,000 cPs in which any endpoint within these ranges can serve as endpoints for any additional sub-range falling therein at 22.5° C. to 27.0° C. To obtain adequate application times, dwell times, and/or rust removal times on the disclosed substrates, the above-mentioned viscosities are preferred for proper application of the gelatinous rust removal composition to the substrate/metal substrate to ensure rust removal from the disclosed substrates. Furthermore, viscosities may be varied according to end-use applications such as an end-use gel dispensed from a non-pressured container/vessel 1750 cPs to 4000 cPs, with 1750 cPs to 3550 cPs being preferred and/or 2000 cPs to 3000 cPs being most preferred at ambient conditions or an end-use gelatinous rust removal composition in a pressurized container configured to be dispensed therefrom 175 cPs to 500 cPs, with 190 cPs to 250 cPs being preferred and/or 200 cPs being most preferred at ambient conditions.

The chlorinated acid is present at a concentration ranging from 50 wt % to 80 wt %, more preferably 55 wt % to 75 wt %, even more preferably 60 wt % to 70 wt %, in which any endpoint within these ranges can serve as endpoints for any additional sub-range falling therein, of an overall concentration of the gelatinous composition and/or an active concentration of 15 wt % to 27 wt %, more preferably 17.5 wt % to 25 wt %, even more preferably 20 wt % to 25 wt %, in which any endpoint within these ranges can serve as endpoints for any additional sub-range falling therein, of the overall concentration of the gelatinous composition. The chlorinated acid is preferably homogeneously dispersed throughout the gelatinous rust removal composition thereby ensuring even and/or uniform rust removal from the substrate post-application thereon/thereto. In certain aspects, the chlorinated acid is preferably an inorganic acid. In certain aspects, the chlorinated acid has a molecular weight ranging from 20 g/mol to 100 g/mol, preferably 30 g/mol to 50 g/mol in which any endpoint within these ranges can serve as endpoints for any additional sub-range falling therein. In certain aspects, the chlorinated acid has a density ranging from 1.0 g/mL to 1.8 g/mL, more preferably 1.1 g/mL to 1.5 g/mL in which any endpoint within these ranges can serve as endpoints for any additional sub-range falling therein. In certain aspects, the inorganic acid includes muriatic acid either alone or in a blend of inorganic acids.

To obtain desired vapor pressure of the gelatinous rust removal composition and/or of the chlorinated acid disclosed herein to avoid excessive noxious fuming, the disclosed chlorinated acid concentrations, and more particularly, the active concentrations disclosed herein should not be exceeded. For example, when muriatic acid is used and exceeds, for example, 25 wt % active concentration (of the overall concentration of the gelatinous rust removal composition), vapor pressure significantly increases thereby resulting in excessive noxious fumes/fuming of the composition that may act as a pulmonary irritant, thereby requiring protective masks and/or ventilators. In certain aspects, it is desirable to maintain vapor pressure of the chlorinated acid and/or of the gelatinous rust removal composition to below 15.0 Mm Hg at 20° C. to 30° C. in which the vapor pressure may range from 0.1 Mm Hg to 15 Mm Hg, more preferably 0.175 mm Hg to 4.5 mm Hg (in which any endpoint within these ranges can serve as endpoints for any additional sub-range falling therein) at 20° C. to 30° C. If vapor pressures of 15.0 Mm Hg at 20° C. to 30° C. are exceeded, the unwanted fuming discussed above will occur.

The surfactant is present at a concentration ranging from 0.5 wt % to 5 wt %, preferably 1 wt % to 4 wt % of the overall concentration of the gelatinous composition in which any endpoint within these ranges can serve as endpoints for any additional sub-range falling therein. The concentration(s) disclosed herein are preferred because the surfactant and more preferably the tallow amine surfactant aids in providing/imparting overall viscosity of the composition. In certain aspects, the surfactant's concentration will not drop below 0.5 wt % because the overall minimally desired viscosity of the composition will not be obtained affecting the composition's dwell times and rust removal efficacy and in certain aspects the surfactant's concentration will not exceed 4.0 wt % because the surfactant's concentration interferes with the chlorinated acid's efficacy resulting in decreased rust removal efficacy (e.g., decreased rust removal times) as well as adversely affects the composition's viscosity and spreadability/applicability to a substrate. In certain aspects, the surfactant has a dual-role within the gelatinous rust removal composition such that the surfactant acts as a thickening agent imparting the desired viscosities of the composition at ambient temperatures as well as aiding coating formation and/or adherence to the substrate post-application of the composition thereon. In certain aspects, the surfactant is a non-ionic surfactant. In certain aspects, the surfactant comprises a hydrophilic-lipophilic balance (HLB) value of less than 10; and/or a HLB ranging from 1.0 to 9.5, more preferably 1.5 to 7.5, even more preferably 2.5 to 6.5, even more preferably 3.0 to 5.5 in which any endpoint within these ranges can serve as endpoints for any additional sub-range falling therein; and/or a viscosity of 65 to 75 cPs, more preferably 68 to 72 cPs at 38° C. The HLB value(s) disclosed herein are preferred to obtain desired composition viscosity and solubility. In certain aspects, the surfactant's HLB value will not be below 1.0 because the surfactant will be water insoluble, and in certain aspects the surfactant's HLB value will not exceed 9.5 because overall viscosity of the composition may be disadvantageously affected (e.g., increases too much). In certain aspects, the surfactant is used for water-in-oil emulsions or oil-in-water emulsions.

Moreover, the surfactant in the gelatinous rust removal composition comprises a surfactant having an amine moiety, an alcohol moiety, or a combination thereof. In certain aspects, the surfactant comprises an amine ethoxylate. In certain aspects, the surfactant comprises tallow amine ethoxylates. In certain aspects, the tallow amine ethoxylates have the chemical structure provided by Formula I below, wherein x is any integer from 3 to 15, y is any integer from 3 to 15, R is $C_nH_m$, wherein n is any integer from 12 to 18, and m is any one of 2n−1, 2n+1, 2n−3, 2n−5, or 2n−7.

Formula I

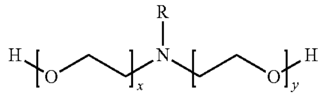

As alluded to above, in certain aspects, the surfactant and more particularly the amine ethoxylate, more preferably the tallow amine ethoxylates has a dual-role within the gelatinous rust removal composition such that the surfactant acts as a thickening agent imparting the desired viscosities of the composition at ambient temperatures as well as aiding coating formation and/or adherence to the substrate post-application of the composition thereon. Thus, the use of other surfactants would negatively affect the desired viscosities and coating formation and/or adherence to the substrate post-application.

The corrosion inhibitor is present in the gelatinous composition in an effective amount to impart corrosion inhibition, resistance, and/or re-rust inhibition and/or resistance post-application of the gelatinous composition to a substrate (i.e., a substrate having rust scales thereon). In certain aspects the corrosion inhibitor is a chelant and/or a chelating agent capable of, for example, binding iron and/or iron oxide(s) (e.g., rust and/or rust scales) and cleaning and/or removing iron and/or iron oxide(s) (e.g., rust and/or rust scales) from a substrate post-application of the liquid composition to the substrate. The corrosion inhibitor is present at a concentration ranging from 1 wt % to 5 wt %, preferably 2 wt % to 4 wt % of the overall concentration of the gelatinous composition in which any endpoint within these ranges can serve as endpoints for any additional sub-range falling therein. In certain aspects, the corrosion inhibitor has a molecular weight ranging from 125 g/mol to 175 g/mol, preferably 140 g/mol to 160 g/mol in which any endpoint within these ranges can serve as endpoints for any additional sub-range falling therein. In certain aspects, the corrosion inhibitor has a boiling point ranging from 300° C. to 375° C., preferably 325° C. to 350° C. in which any endpoint within these ranges can serve as endpoints for any additional sub-range falling therein. In certain aspects, the corrosion inhibitor is a tertiary amino compound. In certain aspects, the corrosion inhibitor has an amine moiety and/or an alcohol moiety and/or is an amino alcohol compound. In certain aspects, the corrosion inhibitor includes at least and/or is preferably triethanolamine. In certain aspects, the ratio of the corrosion inhibitor to the chlorinated acid is present in 1:20 to 1:40, more preferably 1:15 to 1:35 in which any endpoint within these ranges can serve as endpoints for any additional sub-range falling therein. In certain aspects, the corrosion inhibitor is homogeneously dispersed within the gelatinous composition.

Also disclosed herein are rust removal methods including (a) applying the above-mentioned gelatinous rust removal composition(s) to a metal substrate, more preferably to a metal substrate having oxidized iron and/or iron oxides (rust) thereon, for example, for a predetermined period of time (for example 2 minutes to 5 hours, more preferably 20 minutes to 3 hours in which any endpoint within these ranges can serve as endpoints for any additional sub-range falling therein); and (b) removing oxidized iron and/or iron oxides (rust) from a surface of the metal substrate to achieve a desired clean surface appearance. Either during and/or after step (b), after the cleaning solution is applied to the rusty part, the consumer can use a stiff bristle brush to remove loosened rust. After all rust is removed rinse item with water and dry thoroughly. The desired clean surface appearance may include a substrate having an L value ranging from 50 to 85, more preferably 60 to 85, even more preferably 65 to 80 after step (b) and/or a change in L value ranging from 18 to 40, more preferably 25 to 40 (post-application and removal of the liquid composition), in which any endpoint within these ranges can serve as endpoints for any additional sub-range falling therein, when compared with the initial L value (pre-application of the liquid composition). In certain aspects, no acid etching occurs on the outer surface of the substrate post-application and/or post-removal of the oxidized iron and/or iron oxides (rust) from the surface of the metal substrate. In certain aspects, the rate of re-rust of the metal substrate (post-rust removal) is much slower over a predetermined time period (e.g., two days, two weeks, one month, or six months) and exhibits considerably higher L-values during this time period when compared with substrates cleaned with conventional rust removers. In certain aspects, the metal substrate includes but is not limited to tools (wrenches, hammers, screw drivers, plyers, bolts, screws, nails, rotors, hooks for hanging items, shovels, scissors), automotive parts, and decorative items. In certain aspects, the gelatinous rust remover composition may be dispensed as a gel and/or jelly-like substances from a non-pressured container/vessel, for example from a non-pressurized tube, having 1750 cPs to 4000 cPs, with 1750 cPs to 3550 cPs being preferred and/or 2000 cPs to 3000 cPs being most preferred at ambient conditions or the gelatinous rust removal composition may be dispensed from a pressurized container as a gelatinous aerosol configured to be dispensed therefrom having 175 cPs to 500 cPs, with 190 cPs to 250 cPs being preferred and/or 200 cPs being most preferred at ambient conditions. In each of these aspects, the gelatinous rust remover composition(s) are configured for optimal application and/or dwell time of a gelatinous rust remover composition on the substrate/metal substrate and/or removal of rust from the substrate and/or metal substrate.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

Working Examples

The following examples are put forth so as to provide those of ordinary skill in the art with a complete disclosure and description of how the compositions and methods described and claimed herein are made and evaluated and are intended to be purely exemplary and are not intended to limit the scope of what the inventors regard as their invention.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature if not listed, and pressure is at or near atmospheric.

Tables 1, 3, and 4 below show the general chemical components and concentration ranges of the exemplary liquid rust removal composition (Table 1: Exemplary Composition(s) 1) and exemplary gelatinous rust removal compositions (Tables 3 and 4).

TABLE 1

Exemplary Liquid Rust Removal Composition(s) 1: Rust Soak

| Components | Weight % |
|---|---|
| DI Water | 75-80 |
| [1]Corrosion Inhibitor (Triethanolamine) | 10-15 |
| [2]Acid Mixture/Blend | 10-15 |
| [3]Surfactant (Alkyl Polyglucoside) | 1-5 |

1—Triethanolamine, sourced from The Dow Chemical Company (Triethanolamine 99%, CAS No.: 102-71-6, Safety Data Sheet (2022) incorporated by reference herein)

2—Acid Mixture/Blend can include:

Dequest 2010 Composition, sourced from Italmatch Chemicals (DEQUEST® 2010, Safety Data Sheet (2023) incorporated by reference herein)

1-hydroxyethylidene-1,1-diphosphonic acid 58-62% (CAS No.: 2809-21-4)

Phosphorous Acid 1.8-2.5% (CAS No.: 10294-56-1) (also referred to as phosphonic acid)

AQUACID 105NS, sourced from AQUAPHARM (AQUACID 105NS, Safety Data Sheet (2023) incorporated by reference herein)

1-hydroxyethylidene 1,1-diphosphonic acid 58-62% (CAS No.: 2809-21-4)

Phosphonic Acid <2% (CAS No.: 13598-36-2) (also referred to as phosphorous acid)

3—Glucopon 215UP Composition, sourced from BASF (Glucopon® 215 UP, Safety Data Sheet (2019) incorporated by reference)

C8C10-Alkyl polyglucoside (CAS No.: 68515-73-1)

Figure 2:
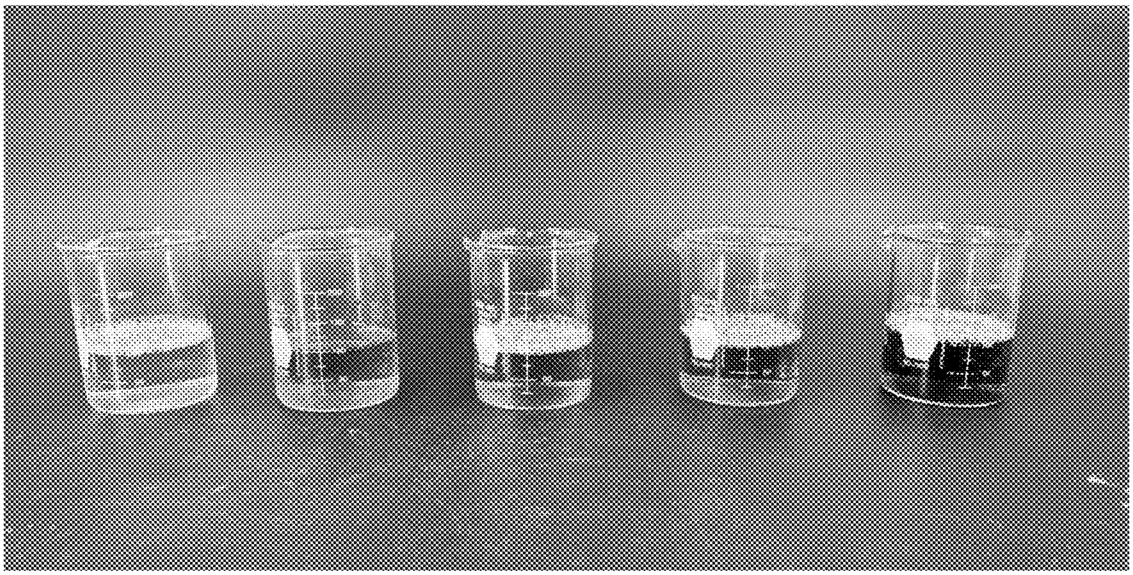
FIG. 2 is a photograph displaying the gradual coloration of Ex. 1 from FIG. 1 after repeated uses/after rust removal from a plurality of metal substrates.
Figure 3:
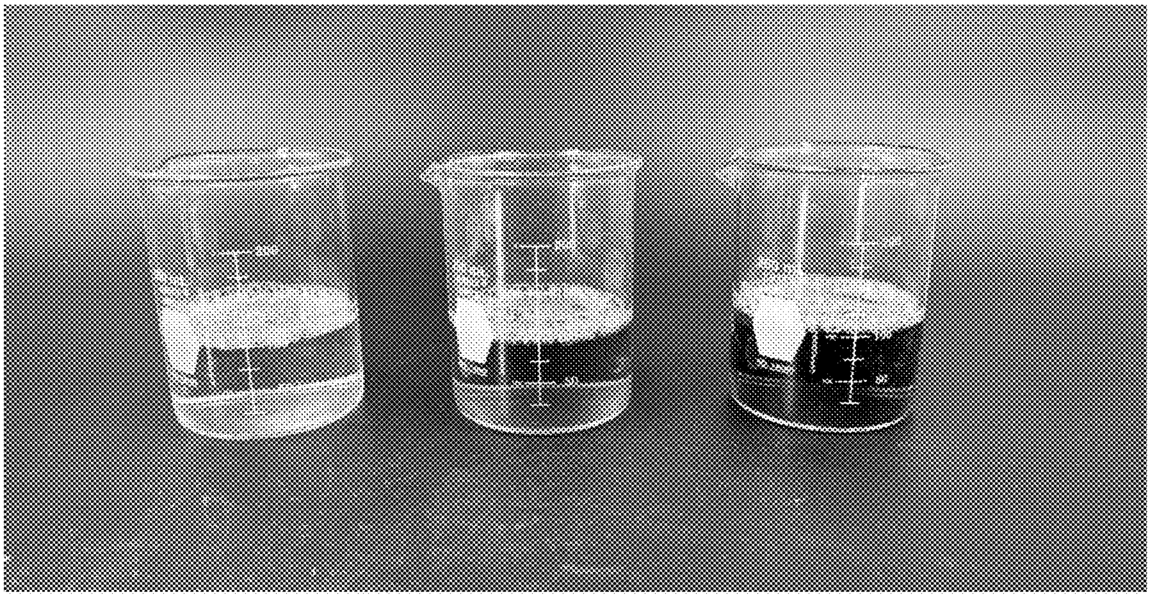
FIG. 3 is a photograph displaying the gradual coloration of the competitor's solution (Comp. 1) from FIG. 1 after repeated uses/after rust removal from a plurality of metal substrates.

In view of the compositions provided in Table 1, FIG. 1 displays the rust removal efficacy of an exemplary composition (Ex. 1) and a comparative formulation (Comp. 1; analogous to Blaster Metal Rescue Rust Remover Bath, Safety Data Sheet (2019), incorporated by reference herein) from metal panels after repeated uses of the Ex. 1 and Comp. 1, respectively. Ex. 1 was prepared according to Table 2. The first panel (WM BARR 1) was sequentially soaked for 2 hours in a solution of Ex. 1 and removed. The second panel (WM BARR 2) was then soaked for 2 hours in the same solution and removed. The third panel (WM BARR 3) was then soaked for 2 hours in the same solution and removed. This process was repeated for each panel (WM BARR 4-9). The same process was performed for the bottom panels (COMPETITION 1-9) with a solution of Comp. 1. The bottom panels lost performance at panel 4 which can be seen from the dark marks/spots present on the panel. The panel 4 which was treated with Ex. 1 maintained the rust removing performance. Indeed, all 9 panels which were treated with Ex. 1 maintained the rust removing efficacy/performance when compared to the metal panels treated with Comp. 1. FIG. 2 and FIG. 3 show the gradual coloration of Ex. 1 and the competitor's solution (Comp. 1), respectively, after repeated uses of removing rust from a plurality of metal panels. Ex. 1 displays prolonged efficacy as the color change is more gradual. Comp. 1 displays a faster decrease in efficacy over time as the color significantly darkens after 4 uses. The gradual color change of Ex. 1 demonstrates the formulation can remove rust for an extended period of time when compared to Comp. 1.

TABLE 2

Concentrations of Ex. 1 from FIG. 1

| Components | Ex. 1 |
|---|---|
| DI Water | 75% |
| Corrosion Inhibitor (Triethanolamine) | 12% |
| Acid Mixture/Blend | 12% |
| Surfactant (Alkyl Polyglucoside) | 1% |

TABLE 3

Exemplary Gelatinous Rust Removal Composition(s) 2: Rust Jelly

| Components | Weight % |
|---|---|
| DI Water | 30-40 |
| [1]Corrosion Inhibitor (Triethanolamine) | 2-4 |
| [4]Surfactant (Tallow Amine Ethoxylate) | 2-4 |
| [5]Muriatic Acid (HCl) (~32% pure/active) | 60-70[6] |

TABLE 4

Exemplary Gelatinous Rust Removal Composition(s) 3: Rust Gel Spray

| Components | Weight % |
|---|---|
| DI Water | 30-40 |
| [1]Corrosion Inhibitor (Triethanolamine) | 2-4 |
| [4]Surfactant (Tallow Amine Ethoxylate) | 1-3 |
| [5]Muriatic Acid (HCl) (~32% pure/active) | 60-70[6] |

4—Biosoft TA2 Composition, sourced from Stepan (BIOSOFT TA-2 Safety Data Sheet (2023) incorporated by reference herein)

TALLOW AMINE ETHOXYLATE, POE-2 (CAS No.: 61791-26-2)

5—Muriatic Acid (HCl), sourced from Sigma-Aldrich (Hydrochloric Acid CAS No.: 7647-01-0, Safety Data Sheet (2024) incorporated by reference)

6—Muriatic acid (HCl) used in Compositions 2 and 3 (above) were approximately 32% pure and/or included 32% active muriatic acid with the remaining 68% being an inert filler and/or carrier (e.g., water). To calculate the final active concentrations and/or final active concentration ranges of muriatic acid (HCl), the following should be used: 60%×0.32=19.2% or 70%×0.32=22.4%.

Figure 4:
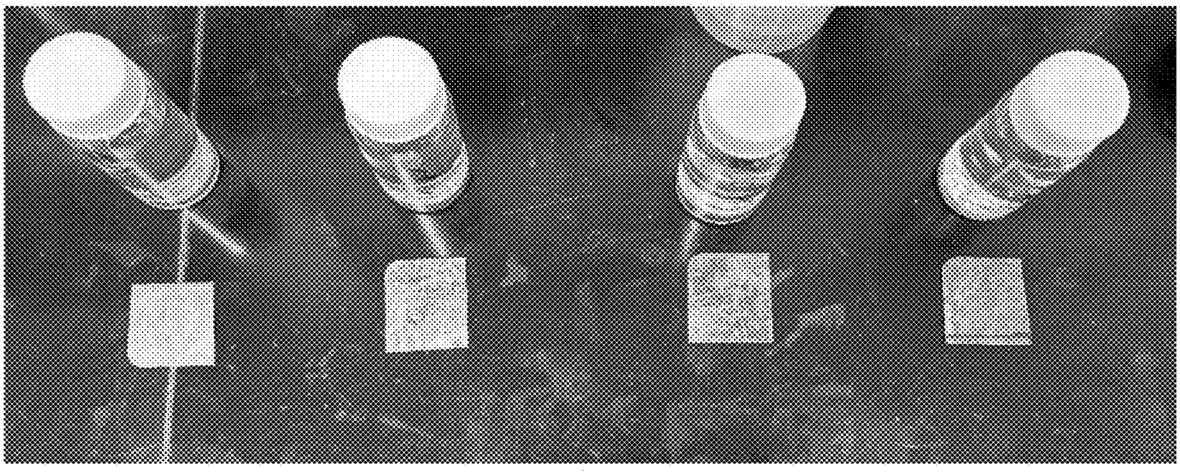
FIG. 4 is a photograph displaying rust removal efficacy from a metal substrate after treatment with Exemplary Compositions and Comparative Compositions having varied concentrations of muriatic acid (HCl).

The compositions disclosed in FIG. 4 and Table 5 were used to benchmark muriatic acid (HCl) levels and rust removal efficacy for the contemplated compositions disclosed in Tables 3 and 4 respectively. In particular and in view of Table 5, performance of 5% (Comp. 4), 10% (Comp. 3), 15% (Comp. 2), and 20% (Ex. 2) active muriatic acid (HCl) and water was evaluated for rust removal efficacy. The above-mentioned compositions were applied to the individual rusted steel panels and left for 2 minutes. The panels were rinsed with water, wiped dried, and the measurements were taken. Table 6 discloses the L-value measurements of each steel panel before and after treatment with an exemplary formulation (Ex. 2) and comparative formulations (Comp. 2, Comp. 3, Comp. 4), shown in FIG. 4. Ex. 2, Comp. 2, Comp. 3, and Comp. 4 were prepared according to Table 5. Six measurements were taken for each panel before and after treatment with the respective formulations/compositions (i.e., Ex. 2 or Comp. 2, 3, or 4). In Table 6, the average respective L-values were calculated for each panel based on the L-value measurements shown in Table 6. Furthermore, the delta L-value representing the overall change in shade was calculated for each panel. L-value measurements are based on a colorimetric scale and represent shades (i.e., light and dark) (calculated by subtracting the average L-values (pre-treatment) from the average L-values (post-treatment)). An L-value of 0 represents a dark shade (i.e., black) and an L-value of 100 represents a light shade (i.e., white). Thus, the more rust present on the surface of the panel, the lower the L-value on the scale (i.e., closer to an L-value of 0), due to the surface appearing darker in shade. Alternatively, higher L-values represent more rust removal from the surface of the panel due to the surface appearing lighter in shade (i.e., L values approaching 100). Higher delta L-values represent a larger change in shade and thus, more rust removal on the surface of the panel. Table 6 and FIG. 4 display higher L-value measurements and a noticeable change in shade on the surface of the panel when Ex. 2 (20% active HCl) is used. Furthermore, the delta L-value is higher when 20% active HCl is used. Thus, when viewing Table 6 and FIG. 4, the preferred active concentration of muriatic acid (HCl) from Table 5 is 20%. Both the average post L-value and delta L-value are higher than the Comparative Examples (Comp. 2-4). Moreover, the visual appearance of the panel (Ex. 2; 20% active HCl) is significantly improved showing complete removal of the rust from the surface. None of the formulations/compositions from Table 5 produced noxious fumes/fuming of the composition even when the active concentration of muriatic acid (HCl) was increased to 20%. In fact, no deleterious observations were exhibited for increasing muriatic acid (HCl) concentrations.

TABLE 5

Concentrations of Formulations from FIG. 4

| Components | Ex. 2 | Comp. 2 | Comp. 3 | Comp. 4 |
|---|---|---|---|---|
| DI Water | 80% | 85% | 90% | 95% |
| Muriatic Acid (HCl) | 20% | 15% | 10% | 5% |

TABLE 6

L-Values and Delta L-Values for Varying Active Concentrations of Muriatic Acid (HCl)

| | Ex. 2 | Comp. 2 | Comp. 3 | Comp. 4 |
|---|---|---|---|---|
| Pre L-Values | 35.87 | 34.27 | 39.01 | 37.33 |
| | 36.92 | 38.74 | 38.45 | 38.74 |
| | 37.84 | 36.41 | 39.80 | 34.87 |
| | 38.92 | 38.86 | 36.16 | 38.51 |
| | 38.68 | 70.51 | 37.02 | 40.70 |
| | 41.79 | 39.79 | 36.31 | 36.33 |
| Average Pre L-Value | 38.34 | 43.10 | 37.79 | 37.75 |
| Post L-Values | 75.31 | 54.55 | 57.43 | 53.57 |
| | 75.16 | 57.15 | 53.46 | 51.82 |
| | 69.28 | 55.14 | 47.27 | 41.96 |
| | 74.42 | 66.11 | 56.30 | 41.81 |
| | 75.85 | 59.81 | 46.90 | 40.42 |
| | 74.57 | 61.97 | 46.36 | 45.44 |
| Average Post L-Value | 74.10 | 59.12 | 51.29 | 45.84 |
| Delta L-Value | 35.76 | 16.03 | 13.50 | 8.09 |

Figure 5:
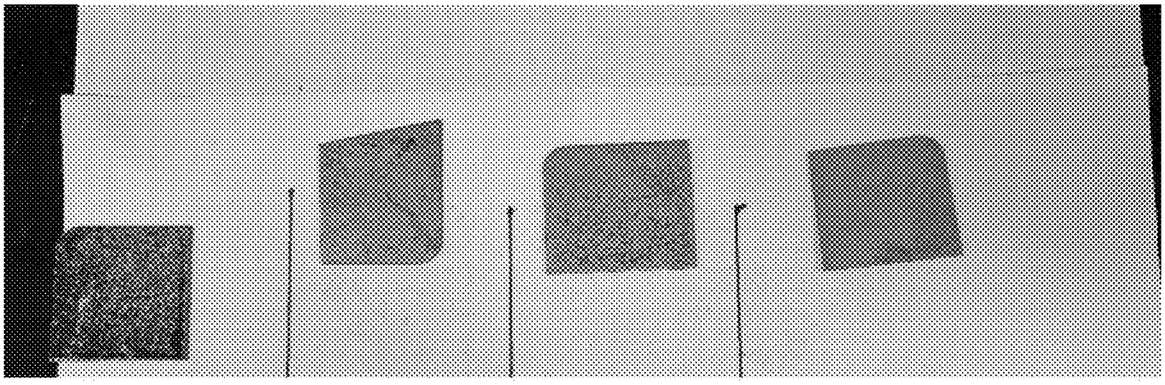
FIG. 5 is another photograph displaying rust removal efficacy from a metal substrate after treatment with Exemplary Compositions and Comparative Compositions having varied concentrations of muriatic acid (HCl).

Similar to Tables 5 and 6 above, the compositions disclosed in FIG. 5 and Table 7 were used to benchmark muriatic acid (HCl) levels and rust removal efficacy for the contemplated compositions disclosed in Tables 3 and 4. In particular and in view of Table 7, performance of 10% (Comp. 3), 20% (Ex. 2), 30% (Comp. 5), and 37% (Ex. 6) active muriatic acid (HCl) and water was evaluated for rust removal efficacy. In particular, Table 8 discloses the L-value measurements of each metal panel before and after treatment with an exemplary formulation (Ex. 2) and comparative formulations (Comp. 3, Comp. 5, Comp. 6), shown in FIG. 5. Ex. 2, Comp. 3, Comp. 5, and Comp. 6 were prepared according to Table 7. Six measurements were taken for each panel before and after treatment with the respective formulations/compositions (i.e., Ex. 2 or Comp. 3, 5, or 6). In Table 8, the average respective L-values were calculated for each panel based on the L-value measurements shown in Table 8. Furthermore, the delta L-value representing the overall change in shade was calculated for each panel. L-value measurements are based on a colorimetric scale and represent shades (i.e., light and dark) (calculated by subtracting the average L-values (pre-treatment) from the average L-values (post-treatment)). An L-value of 0 represents a dark shade (i.e., black) and an L-value of 100 represents a light shade (i.e., white). Thus, the more rust present on the surface of the panel, the lower the L-value on the scale (i.e., closer to an L-value of 0), due to the surface appearing darker in shade. Alternatively, higher L-values represent more rust removal from the surface of the panel due to the surface appearing lighter in shade (i.e., L values approaching 100). Higher delta L-values represent a larger change in shade and thus, more rust removal on the surface of the panel. FIG. 5 and Table 8 display that Comp. 5 (30% HCl) has the highest L-value and delta L-values. However, HCl concentrations above 25% exhibited significantly increased vapor pressure thereby resulting in excessive noxious fumes/fuming of the composition acting as a pulmonary irritant, thereby requiring protective masks and/or ventilators when using. Moreover and surprisingly, when the concentration of muriatic acid (HCl) is increased above 30% (e.g., 37%), the L-value and delta L-value decreases. The increase in muriatic acid (HCl) above 35% can interact with the surfactant preventing the formulation from thickening and coating the steel panel, ultimately decreasing the rust removal on the surface. Thus, Ex 2. provided superior performance (i.e., rust removal/efficacy) without causing fuming and/or decreasing the efficacy of the surfactant.

TABLE 7

Concentrations of Formulations from FIG. 5

| Components | Comp. 3 | Ex. 2 | Comp. 5 | Comp. 6 |
|---|---|---|---|---|
| DI Water | 90% | 80% | 70% | 63% |
| Muriatic Acid (HCl) | 10% | 20% | 30% | 37% |

TABLE 8

L-Values and Delta L-Values for Varying Active Concentrations of Muriatic Acid (HCl)

| | Comp. 3 | Ex. 2 | Comp. 5 | Comp. 6 |
|---|---|---|---|---|
| Pre L-Values | 35.83 | 44.30 | 33.42 | 33.94 |
| | 35.34 | 43.30 | 33.39 | 33.28 |
| | 35.55 | 37.22 | 35.49 | 33.99 |
| | 34.52 | 36.33 | 34.05 | 38.35 |
| | 34.58 | 36.36 | 35.68 | 33.46 |
| | 34.31 | 35.09 | 35.61 | 33.71 |
| Average Pre L-Value | 35.02 | 38.77 | 34.61 | 33.46 |
| Post L-Values | 37.58 | 61.12 | 75.32 | 65.06 |
| | 41.32 | 63.99 | 73.34 | 68.33 |
| | 37.56 | 68.83 | 74.24 | 65.55 |
| | 54.47 | 70.60 | 76.32 | 79.04 |
| | 51.94 | 72.89 | 73.59 | 78.59 |
| | 49.26 | 74.22 | 72.94 | 75.30 |
| Average Post L-Value | 45.36 | 68.61 | 74.29 | 71.98 |
| Delta L-Value | 10.33 | 29.84 | 39.69 | 37.52 |

Figure 6:
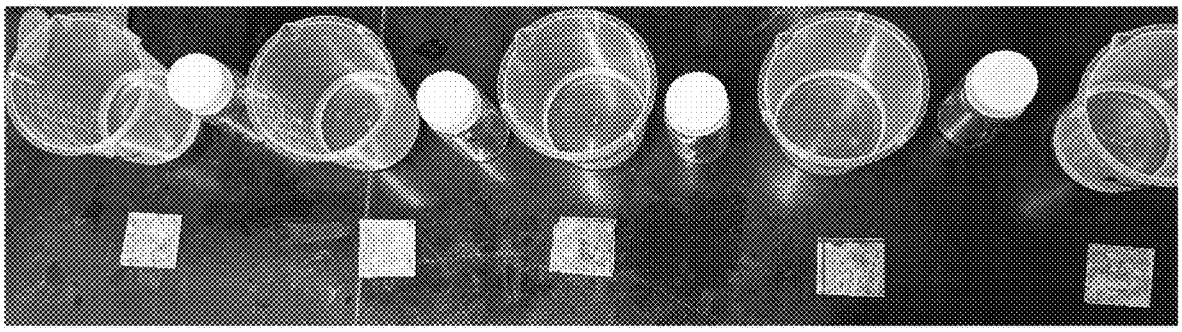
FIG. 6 is a photograph displaying the metal substrates after treatment with the competitor's solution (Comp. 11) and various concentrations of Phosphoric Acid.

In view of the compositions provided in Tables 1-4, FIG. 6 and Table 10 disclose the rust removal results of varying concentrations of Phosphoric Acid at 30% (Comp. 7), 20% (Comp. 8), 10% (Comp. 9), and 5% (Comp. 10) active Phosphoric Acid, and the competitor's solution (Comp. 11; analogous to Rust-oleum® Rust Dissolver Jelly, Safety Data Sheet (2020), incorporated by reference herein). The concentrations of each formulation (i.e., Comp. 7-11) are provided in Table 9.

Phosphoric acid is as an active within conventional rust removal formulations/compositions. However, it is less efficacious than HCl and greater amounts of phosphoric acid are required to achieve comparable cleaning and thus makes it a more expensive option for rust removal. Table 10 and FIG. 6 display the decreased efficacy/performance of Comp. 7-11, which contain varying concentrations of Phosphoric Acid, compared to the formulations (Ex. 2 and Comp. 2-6) with muriatic acid (HCl). The highest L-value and delta L-value was observed for Comp. 7 (30% active Phosphoric Acid), whereas the lowest L-value and delta L-value was observed for Comp. 9 (10% active Phosphoric Acid). These results show that higher concentrations of Phosphoric Acid are required to achieve similar efficacy/performance to the HCl Compositions, as 20% active HCl (e.g., Ex. 2) provided a higher L-value and delta L-value.

TABLE 9

Concentrations of Formulations from FIG. 6

| Components | Comp. 7 | Comp. 8 | Comp. 9 | Comp. 10 | Comp. 11 |
|---|---|---|---|---|---|
| DI Water | 70% | 80% | 90% | 95% | 65% |
| Phosphoric Acid | 30% | 20% | 10% | 5% | 30% |
| D-Gluconic Acid | 0% | 0% | 0% | 0% | 5% |

TABLE 10

L and Delta L-Values for Varying Active Concentrations of Phosphoric Acid (Comp. 7-11)

| | Comp. 7 | Comp. 8 | Comp. 9 | Comp. 10 | Comp. 11 |
|---|---|---|---|---|---|
| Pre L-Values | 38.07 | 35.67 | 35.07 | 36.94 | 38.12 |
| | 41.96 | 37.54 | 33.99 | 37.81 | 35.67 |
| | 38.98 | 35.16 | 32.21 | 35.95 | 37.48 |
| | 38.39 | 37.48 | 35.15 | 39.04 | 38.65 |
| | 37.24 | 37.61 | 37.15 | 39.84 | 37.31 |
| | 39.11 | 37.22 | 36.92 | 39.63 | 37.87 |
| Average Pre L-Value | 38.34 | 43.10 | 37.79 | 37.75 | 37.52 |
| Post L-Values | 63.09 | 32.86 | 53.88 | 55.65 | 61.23 |
| | 58.08 | 61.20 | 48.38 | 56.94 | 55.79 |
| | 64.98 | 65.73 | 52.38 | 61.42 | 56.19 |
| | 55.25 | 59.15 | 46.50 | 56.42 | 50.74 |
| | 55.55 | 57.92 | 44.42 | 54.07 | 46.13 |
| | 54.73 | 61.08 | 55.24 | 57.42 | 54.46 |
| Average Post L-Value | 58.61 | 56.32 | 50.13 | 56.99 | 54.09 |
| Delta L-Value | 19.66 | 19.54 | 15.05 | 18.79 | 16.57 |

Figure 7:
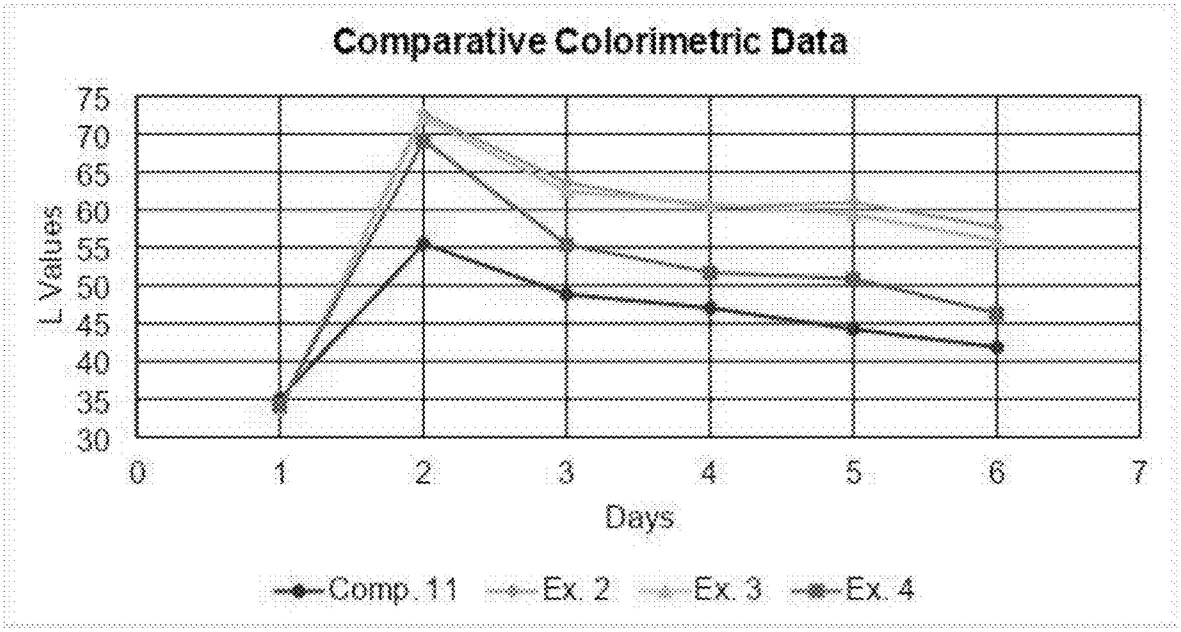
FIG. 7 is a graph depicting L-Value colorimetry of various Exemplary Compositions and the competitor's solution (Comp. 11) during a predetermined time-period as well as the rates of re-rust (measured by decreasing L-Values).

Table 12 and FIG. 7 show the L-values of exemplary formulations and comparative formulations from the first day of treatment (Day 0) to 14 days after treatment to observe the rate of re-rust. Ex. 2, Ex. 3, Ex. 4, and Comp. 11 were prepared according to Table 11. Comp. 11 was compared to 20% muriatic acid (HCl) (Ex. 2), 20% HCl with 5% TEA (Ex. 3), and 20% HCl with 5% TEA and 1% Biosoft (Ex. 4). The "Dirty" column represents the control L-values of a substrate before treatment with the test solution. The L-values were measured at Day 0, Day 2, Day 3, Day 7, and Day 14. All three compositions/formulations with muriatic acid (HCl) display improved L-values when compared to the competitor's solution (Comp. 11), demonstrating a decreased rate of re-rust advantageously indicating longer lasting rust removal efficacy. Thus, allowing for less frequent re-applications of the rust remover composition/formulation to the substrate. The addition of surfactant (1% Biosoft) increased the rate of re-rust, however the surfactant is necessary to achieve the desired viscosity of the composition/formulation. The addition of TEA can improve performance (i.e., decrease the rate of re-rust) by incorporating additional cleaning properties. Including TEA with Biosoft decreases the rate of re-rust, thus demonstrating the synergistic relationship between Biosoft and TEA.

TABLE 11

Concentrations of Formulations from FIG. 7

| Components | Comp. 11 | Ex. 2 | Ex. 3 | Ex. 4 |
|---|---|---|---|---|
| DI Water | 65% | 80% | 75% | 74% |
| Corrosion Inhibitor (Triethanolamine) | 0% | 0% | 5% | 5% |
| Surfactant (Tallow Amine Ethoxylate) | 0% | 0% | 0% | 1% |
| Phosphoric Acid | 30% | 0% | 0% | 0% |
| D-Gluconic Acid | 5% | 0% | 0% | 0% |
| Muriatic Acid (HCl) | 0% | 20% | 20% | 20% |

TABLE 12

L-Values Measured 0 to 14 Days After Treatment with Exemplary and Comparative Formulations

| Test Solutions | L-Values | | | | | |
|---|---|---|---|---|---|---|
| | Dirty | Day 0 | Day 2 | Day 3 | Day 7 | Day 14 |
| Comp. 11 | 35.04 | 55.48 | 48.80 | 47.01 | 44.22 | 41.85 |
| Ex. 2 | 33.60 | 72.69 | 63.6 | 60.31 | 60.97 | 57.66 |
| Ex. 3 | 33.89 | 72.15 | 62.47 | 60.81 | 59.29 | 55.90 |
| Ex. 4 | 34.16 | 69.14 | 55.37 | 51.65 | 50.85 | 46.34 |

Figure 8:
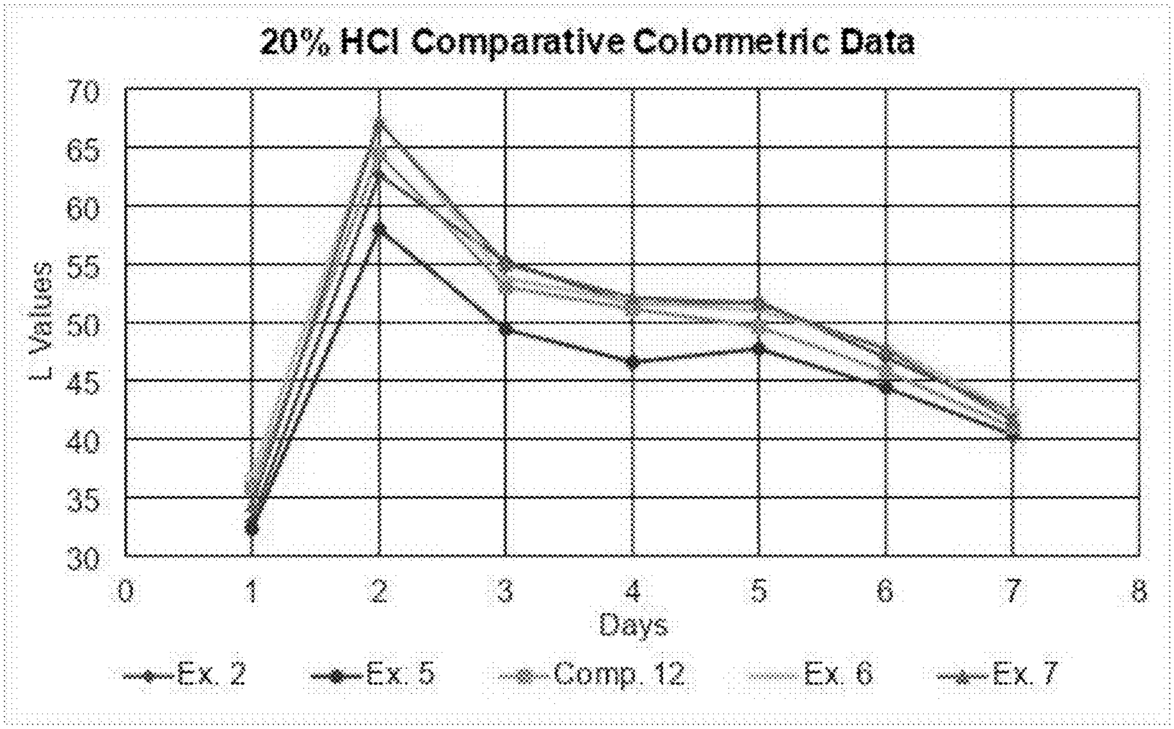
FIG. 8 is a graph depicting L-Value colorimetry of various Exemplary Compositions and a Comparative Composition during a predetermined time-period as well as the rates of re-rust (measured by decreasing L-Values).

Table 14 and FIG. 8 show the L-values of exemplary formulations and comparative formulations from the first day of treatment (Day 0) to 14 days after treatment to observe the rate of re-rust. Ex. 2, Ex. 5-7, and Comp. 12 were prepared according to Table 13. The composition/formulation with solely 20% muriatic acid (HCl) was compared to compositions/formulations with surfactant (1% Biosoft) and varying concentrations of corrosion inhibitor (TEA) to demonstrate how the concentration of the corrosion inhibitor affected the rate of re-rust after treatment. The "Dirty" column represents the control L-values of a substrate before treatment with the test solution. The L-values were measured at Day 0, Day 2, Day 3, Day 7, and Day 14. As previously discussed, adding surfactant (Biosoft) to the composition can increase the rate of re-rust compared to solutions without the surfactant. Including the corrosion inhibitor (TEA) in the composition with Biosoft improves the overall performance (i.e., decreases the rate of re-rust). Surprisingly, Table 11 and FIG. 8 demonstrate that the composition/formulation with 20% active muriatic acid (HCl) and 2% TEA removes rust and prevents re-rust better than the composition with 3% TEA. Thus, a delicate balance exists between muriatic acid (HCl), Biosoft, and TEA.

TABLE 13

Concentrations of Formulations from FIG. 8

| Components | Ex. 2 | Ex. 5 | Comp. 12 | Ex. 6 | Ex. 7 |
|---|---|---|---|---|---|
| DI Water | 80% | 79% | 78% | 77% | 76% |
| Corrosion Inhibitor (Triethanolamine) | 0% | 0% | 1% | 2% | 3% |
| Surfactant (Tallow Amine Ethoxylate) | 0% | 1% | 1% | 1% | 1% |
| Muriatic Acid (HCl) | 20% | 20% | 20% | 20% | 20% |

TABLE 14

L-Values Measured 0 to 14 Days After Treatment with Exemplary and Comparative Formulations

| Test Solutions | Dirty | Day 0 | Day 1 | Day 2 | Day 3 | Day 7 | Day 14 |
|---|---|---|---|---|---|---|---|
| Ex. 2 | 32.97 | 62.61 | 55.23 | 51.60 | 51.78 | 46.94 | 42.28 |
| Ex. 5 | 32.29 | 57.96 | 49.40 | 46.57 | 47.69 | 44.37 | 40.35 |
| Comp. 12 | 35.82 | 64.45 | 53.05 | 51.18 | 49.62 | 45.79 | 41.01 |
| Ex. 6 | 36.90 | 67.32 | 53.79 | 51.77 | 51.04 | 47.92 | 42.41 |
| Ex. 7 | 34.33 | 67.12 | 54.99 | 52.15 | 51.59 | 47.64 | 41.59 |

Figure 9:
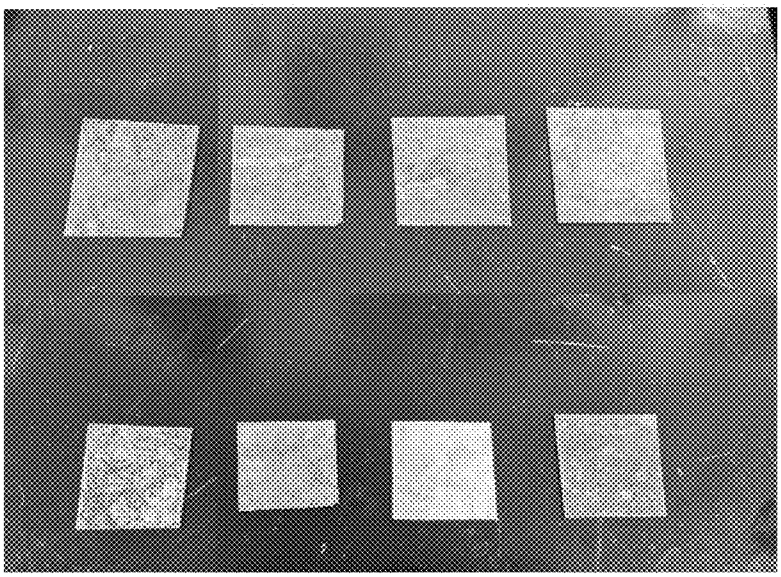
FIG. 9 is a photograph displaying rust removal efficacy from metal substrates before and after treatment with Phosphoric Acid, Hydrochloric Acid, and Sulfuric Acid.

Comparative studies were performed to determine the inorganic acid with the best rust removal efficacy. The rusted steel panels were immersed in the individual inorganic acid solutions (phosphoric acid, hydrochloric acid, and sulfuric acid) and left for 30 seconds. The panels were rinsed with water, wiped dried, and the measurements were taken. Table 15 discloses the L-value measurements of each steel panel before and after treatment as well as the delta values, shown in FIG. 9. As discussed above, phosphoric acid is less efficacious than HCl and greater amounts of phosphoric acid are required to achieve comparable cleaning. Even 30% phosphoric acid is less efficacious than 20% HCl. Moreover, 20% sulfuric acid is significantly less efficacious than 20% HCl.

TABLE 15

L-Values Measured for Different Inorganic Acids

| Inorganic Acid | Pre Treatment L-Value | Post Treatment L-Value | Delta L-Value |
|---|---|---|---|
| 30% Phosphoric Acid | 4.3036 | 4.2935 | 0.0101 |
| 20% Phosphoric Acid | 3.6547 | 3.6452 | 0.0095 |
| 20% Sulfuric Acid | 4.4918 | 4.4858 | 0.006 |
| 20% Muriatic Acid (HCl) | 4.1329 | 4.1201 | 0.0128 |

What is claimed is:

1. A gelatinous rust removal composition comprising:

a chlorinated acid present at an active concentration ranging from 15 wt % to 27 wt % of the overall concentration of the gelatinous composition to remove and/or prevent rust on a substrate post-application;

a surfactant comprising tallow amine ethoxylates present in an effective amount to form a coating and/or adhere to the substrate post-application and that is compatible with the chlorinated acid;

a corrosion inhibitor dispersed within the gelatinous composition, wherein the corrosion inhibitor is a tertiary amino compound, and wherein the ratio of the corrosion inhibitor to the chlorinated acid is 1:20 to 1:40 by weight; and water at a concentration of from 30 wt % to 83.5 wt % of the gelatinous composition;

wherein the gelatinous composition has a pH ranging from 0.75 to 2.5.

2. The gelatinous rust removal composition of claim 1, wherein the chlorinated acid is an inorganic acid.

3. The gelatinous rust removal composition of claim 2, wherein the chlorinated acid has a molecular weight ranging from 20 g/mol to 100 g/mol.

4. The gelatinous rust removal composition of claim 3, wherein the chlorinated acid has a density ranging from 1.0 g/mL to 1.8 g/mL.

5. The gelatinous rust removal composition of claim 2, wherein the inorganic acid comprises muriatic acid.

6. The gelatinous rust removal composition of claim 1, wherein the surfactant is present at a concentration ranging from 0.5 wt % to 5 wt % of the overall concentration of the gelatinous composition and/or the surfactant is present in the gelatinous rust removal composition at an effective amount acting as a thickening agent imparting a predetermined viscosity to the composition at ambient temperature.

7. The gelatinous rust removal composition of claim 1, wherein the surfactant is used for water-in-oil emulsions or oil-in-water emulsions.

8. The gelatinous rust removal composition of claim 1, wherein the corrosion inhibitor is present in the gelatinous composition in an effective amount to impart corrosion inhibition, resistance, and/or re-rust inhibition and/or resistance post-application of the gelatinous composition to a substrate.

9. The gelatinous rust removal composition of claim 1, wherein the gelatinous composition has a viscosity ranging from 10 cPs to 10,000 cPs at 22.5° C. to 27.0° C.

10. The gelatinous rust removal composition of claim 1, wherein the corrosion inhibitor has a molecular weight ranging from 125 g/mol to 175 g/mol.

11. The gelatinous rust removal composition of claim 10, wherein the corrosion inhibitor has a boiling point ranging from 300° C. to 375° C.

12. The gelatinous rust removal composition of claim 1, wherein the corrosion inhibitor is triethanolamine.

13. The gelatinous rust removal composition of claim 1, wherein the corrosion inhibitor is homogeneously dispersed within the gelatinous composition.

14. An article comprising a metal substrate in contact with the gelatinous rust removal composition of claim 1.

15. The article of claim 14, wherein the metal substrate is a ferrous containing metal substrate.

16. The article of claim 14, wherein the metal substrate comprises oxidized iron rust and/or rust scale(s).

17. A rust removal method comprising:

(a) applying the gelatinous rust removal composition of claim 1 to a metal substrate; and (b) removing rust from a surface of the metal substrate.

* * * * *